Oct. 6, 1970               T. O. PAINE            3,532,427
ADMINISTRATOR OF THE NATIONAL AERONAUTICS
AND SPACE ADMINISTRATION
LASER DOPPLER SYSTEM FOR MEASURING THREE
DIMENSIONAL VECTOR VELOCITY
Filed April 22, 1969

ROBERT M. HUFFAKER
KENNETH F. KINNARD
EDWARD ROLF
           INVENTORS

BY

ATTORNEYS

United States Patent Office 3,532,427
Patented Oct. 6, 1970

3,532,427
LASER DOPPLER SYSTEM FOR MEASURING THREE DIMENSIONAL VECTOR VELOCITY
T. O. Paine, Administrator of the National Aeronautics and Space Administration, with respect to an invention of Edward Rolf, Lincoln, and Kenneth F. Kinnard, Lexington, Mass., and Robert M. Huffaker, Huntsville, Ala.
Filed Apr. 22, 1969, Ser. No. 818,349
Int. Cl. G01p 5/00
U.S. Cl. 356—28                6 Claims

ABSTRACT OF THE DISCLOSURE

A laser Doppler velocimeter for measuring the mean velocity and turbulence of a fluid flow. Optical homodyning of a portion of a laser beam scattered from moving particles embedded in a flowing fluid with a portion of the laser beam is made from three different viewing angles to produce beat signals at the frequency of the Doppler shift due to the motion of the fluid. The Doppler shift signal containing the mean velocity and turbulence information is frequency demodulated to produce a fluctuating DC output. The DC output corresponds to a carrier frequency or mean velocity of the fluid and a time-dependent random signal corresponding to the turbulent fluctuations in the fluid flow.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 535, 42 U.S.C. 2457).

BACKGROUND OF THE INVENTION

This invention relates to an apparatus for measuring fluid flow velocity and more particularly to an apparatus for determining the three-dimensional vector mean velocity and turbulence of a fluid flow.

The measurement of fluid flow in both the gas and liquid state is a well-developed art and a wide variety of devices have been developed over the years for accomplishing this measurement. Examples of such devices are Venturi, orifice and Pitot tubes, moveable vane, positive displacement, and hot wire anemometry. The primary disadvantage of most previous methods of flow measurement techniques has been their dependence on maintaining constant physical properties in the flowing field being measured. Thus, changes in the parameters such as density or viscosity of a fluid will result in errors since most previous devices will remain calibrated only within very restricted ranges of these parameters. A second disadvantage is that almost without exception other methods of flow measurement require the introduction of a physical testing device into the flow being measured. The introduction of such devices into the flow tends to distort the flow being measured. A third disadvantage results from the fact that since the physical probe of some sort is used, the devices are subject to damage in an extremely hostile environment such as high temperature or a chemically corrosive fluid.

It is therefore one object of the present invention to provide an apparatus for measuring the three-dimensional vector mean velocity and turbulence of a fluid flow.

It is another object of the present invention to provide an apparatus for obtaining a velocity profile independent of the physical properties of the fluid.

It is another object of the present invention to provide a system capable of measuring a very wide range of flow rate ranging from a subsonic to the supersonic.

SUMMARY OF THE INVENTION

In general the present invention is based on the principle of detecting the Doppler shift introduced into the frequency of a coherent laser beam scattered from the moving particles embedded in a flow. Measurements are made in three dimensions by providing three independent receiving systems that are all focused on the same scattering volume illuminated by the coherent beam. The Doppler shifted, scattered coherent beams are homodyned by coherently mixing them with portions of the laser beam that have not been Doppler shifted to obtain periodic signals having a frequency equal to the difference in frequency of the beams. The nature of the difference signal or Doppler shift provided by a turbulent flow is a rapidly varying frequency centered about a mean frequency. A frequency to voltage converter is provided for converting the Doppler shift in frequency into a DC voltage level corresponding to a carrier frequency or mean velocity and a time dependent random signal corresponding to the turbulent fluctuations.

A more complete understanding of the invention will thus be obtained from consideration of the accompanying drawings in which.

DESCRIPTION OF THE PREFERRED EMBODIMENT

Figure 1:
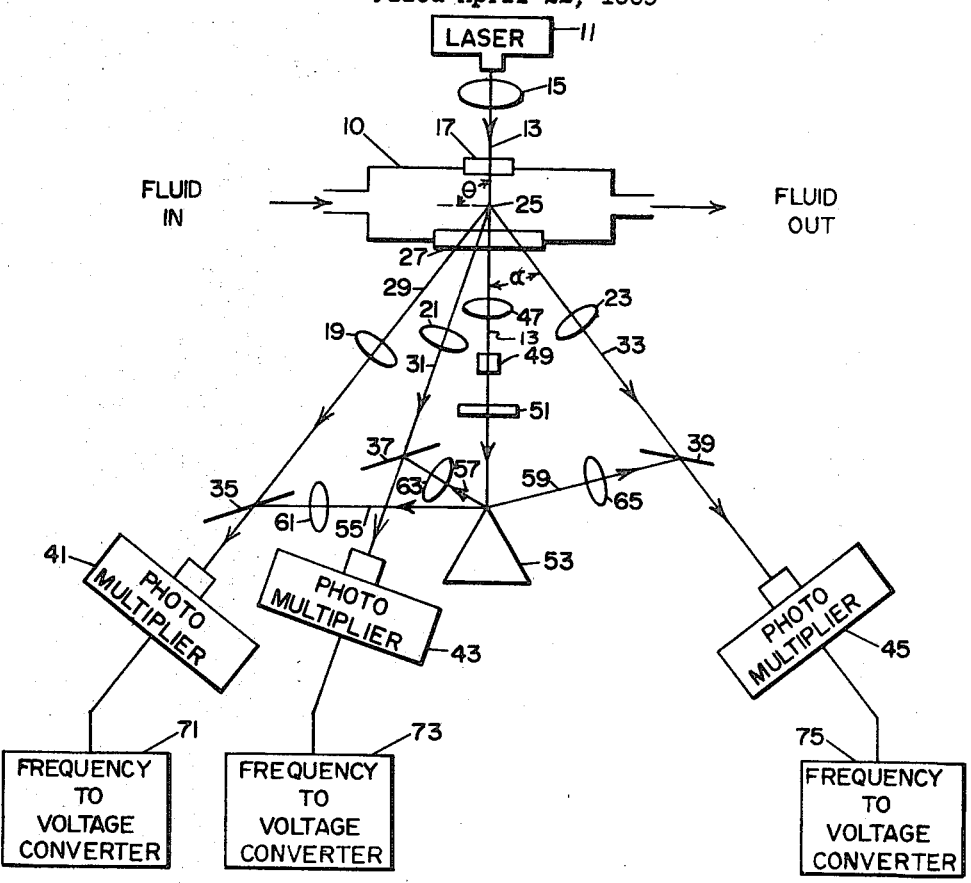
FIG. 1 is a schematic diagram of the three-dimensional Doppler velocimeter according to the present invention.

Reference is made to FIG. 1 to illustrate the operation of the present invention in the measurement of the mean velocity and turbulence of a stream of fluid through a chamber 10. The apparatus includes a source of coherent radiation, such as a laser 11, that is capable of generating a coherent beam 13. The beam 13 is directed to a stream of fluid through a focusing lens 15 and transparent window 17 disposed in chamber 10. The lens 15 is utilized to focus the beam 13 onto a scattering volume 25 at a desired location in the stream of fluid.

The fluid is seeded with optical scattering particles so that a portion of the laser beam 13 is scattered by these particles embedded in the fluid flow. Preferably the size of the particles is such that the particles follow the turbulent flow accurately and do not change the flow. In one embodiment the size of the particles was approximately .5 micron and the scatter is described by the Mie theory. The Doppler shift in frequency of the beam 13 as a result of scattering from the moving particles is given by $$\Delta f_s = \frac{v}{\lambda}[(\cos\theta - 1)\cos\alpha - \sin\theta\sin\alpha] \quad (1)$$

wherein $\Delta f_s$ is the Doppler shift, $v$ is the velocity of the fluid, $\lambda$ is wavelength of beam 13, $\alpha$ is the angle of incidence of beam 13 with the fluid and $\theta$ is the angle of the scattered light from the axis of beam 13.

Lenses 19, 21 and 23 are utilized for viewing through transparent window 27 the scattered beams 29, 31 and 33 from the scattering volume 25. Lenses 19, 21 and 23 are located a distance such that the scattering volume is focused on the photo-multipliers 41, 43 and 45. It will be understood that lenses 19, 21 and 23 may be positioned at any angle around the axis of the laser beam 13 so as to view either forward scattered light as shown in FIG. 1 or backward scattered light and that the scattering volume is defined by the intersection of the focal regions of lens 15 respectively with lenses 19, 21 and 23. It will also be recognized that by measuring the Doppler shift at three scattering angles, the components of the vector velocity along three orthogonal axes can be determined.

To obtain measurements of the Doppler shift, portions of the scattered beams 29, 31 and 33 are directed through beam splitters 35, 37 and 39 respectively, onto a mixer such as photo-multipliers 41, 43 and 45. The three-Doppler-shifted scattered light beams are homodyned at each photo-multiplier by coherently mixing them with portions of the laser beam 13 that has not been Doppler shifted. This process may be accomplished by allowing a portion of beam 13 to pass straight through window 27. The beam 13 is focused by lens 47 and is divided by a beam splitting prism 53 into reference beams 55, 57 and 59. The reference beams are focused by lenses 61, 63 and 65 respectively onto beam splitters 35, 37 and 39 which in turn directs a portion of each reference beam to photo-multipliers 41, 43 and 45 on the same axis as the scattered beams 29, 31 and 33.

Disposed on the reference arm of the present invention is a single sideband modulator 49 and also a variable neutral density filter 51 for adjusting the intensity of the reference beams 55, 57 and 59 so as not to overdrive the photo-multiplier tube while still maintaining the ratio of the intensity of the reference beams 55, 57 and 59 to the respective scattered beams 29, 31 and 33 much greater than one.

The need for the use of a single sideband modulator in the reference arm of the system is brought about by the fact that a photo-multiplier is a square law detector. Accordingly the Doppler shift $\Delta f_s$ resulting from homodyning the reference beams with the Doppler shifted scattered beams is a scaler and an ambiguity of 180° in the vector velocity measurement of flow can occur. To determine whether the frequency of the reference signal is greater or less than the Doppler shifted scattered signal frequency the insertion of an optical single sideband modulator is made to up or down convert the frequency of the reference beam 13 by an amount greater than the maximum expected Doppler shift. The direction of the velocity compnoent may then be made by determining whether the difference in frequency between the reference signal and the Doppler shifted scattered signal is greater or less than the single sideband modulator. The insertion of a single sideband in the beam 13 or reference signal may be accomplished through the use of a modulator 49. It will be recognized that in those applications that the direction of the velocity vector is known, the use of the modulator 49 may be eliminated.

In processing the output signals of the photo-multipliers 41, 43 and 45 in a system for measuring both the mean velocity and turbulent motion of a fluid flow, the flow can be divided into a temporal mean and turbulent part. The velocity components in the flow can be written as $$u(t) = \overline{u}(t') + u'(t) \quad (2)$$

where $\overline{u}(t')$ equals the mean velocity of flow, averaged over a relatively long time period $t'$; and $u'(t)$ equals the time dependent turbulent velocity fluctuation part. Any turbulence that generates a change in velocity in the fluid will as expressed in Equation 1, generate a corresponding Doppler shift in the laser wave front incident upon it. This frequency shift is detected by the homodyning of the reference and the scattered beams on the photo-multiplier as previously described. For a given velocity, the Doppler shift corresponds to some carrier frequency and any turbulence in the medium introduces additional Doppler shifts that modulates this carrier frequency. Therefore, Equation 2 can be expressed in the terms of corresponding Doppler frequency components as follows:

$$\Delta f_s(t) = f_c(t') + f_{dev.}(t)$$

wherein:

$f_c(t')$ = carrier frequency corresponding to $\overline{u}(t')$
$f_{dev.}(t)$ = frequency deviation corresponding to $u'(t)$ Accordingly the nature of the Doppler shift signal provided by a turbulent flow is a rapidly varying frequency centered about a mean frequency. Therefore to obtain the turbulent information the Doppler shift input frequency must be demodulated.

Figure 2:
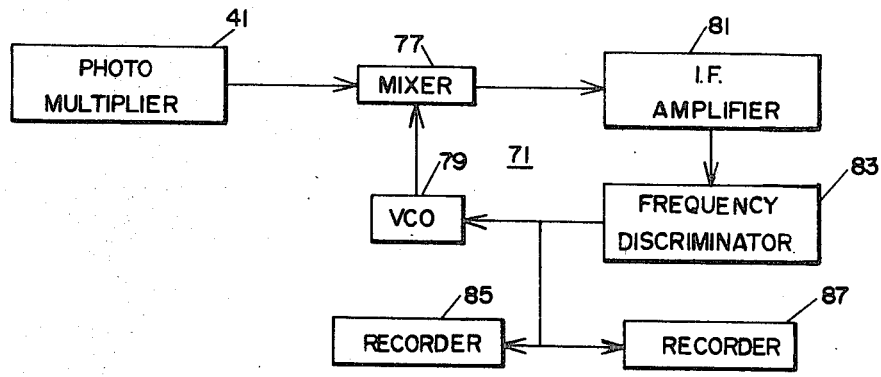
FIG. 2 is a block diagram of the frequency to voltage converter of FIG. 1.

The output signals of the photo-multipliers 41, 43 and 45 are respectively demodulated by frequency to voltage converters 71, 73 and 75. Turning now to FIG. 2 there is shown a more detailed block diagram of a frequency to voltage converter suitable for use in FIG. 1. As shown, the output of the photo-multipliers, such as photo-multiplier 41 is heterodyned in a mixer 77 with the output signal derived from a voltage controlled oscillator 79. The output of the mixer 77 is the sum and difference frequency of the output signal of the VCO 79 and the photo-multiplier 41. The output of the mixer is applied to an IF amplifier and bandpass filter 81 which removes the sum frequency and amplifies the difference frequency. The output signal of the IF amplifier 81 is applied to a frequency discriminator 83 having a predetermined center frequency. The output of the frequency discriminator is fed back to the input of the VCO 79 which in turn modulates the output of the VCO to reduce the instantaneous frequency difference between the Doppler shift frequency.

To obtain the mean velocity and turbulence information, the DC output voltage of the frequency discriminator is monitored by recorder 85 and the AC output voltage or fluctuation is monitored by recorder 87 for statistical turbulence information.

It will now be seen that the present invention provides a very accurate means of measuring the three-dimensional vector velocity of a fluid flow. The apparatus does not disturb the fluid flow and because the scattering volume can be made very small, the resolution of the system is very high.

The invention is not to be restricted to the specific structural details, arrangement of parts, or circuit connections herein set forth, as various modifications therein may be effected without departing from the spirit and scope of this invention.

What is claimed is:

1. An apparatus for measuring the three-dimensional mean velocity and turbulence of a stream of fluid comprising:

means for generating a beam of coherent radiation;
means for directing said beam onto a predetermined scattering volume in said stream of fluid;
first, second and third radiation mixing means respectively responsive to a Doppler-shifted signal and a reference signal for producing an electrical output signal having a frequency equal to the difference in frequency of said Doppler-shifted signal and said reference signal;
first, second and third recieving means positiond around the axis of said beam of coherent radiation for collecting Doppler-shifted scattered radiation from said scattering volume at three different scattering angles and for directing said Doppler shifted radiation respectively to said first, second and third radiation mixing means to form said Doppler-shifted signal;
means for directing portions of said beam of coherent radiation to said first, second and third radiation mixing means to form said reference signal; and
first, second and third frequency to voltage converters connected respectively to the output of said first, second and third radiation mixing means for frequency demodulating said electrical output signals so as to obtain a fluctuating output voltage having a DC level corresponding to the mean velocity of said stream of fluid and AC component corresponding to the turbulence spectrum of said stream of fluid.

2. The apparatus of claim 1 wherein said first, second and third radiation mixing means comprise photo-multipliers.

3. The apparatus of claim 2 wherein said first, second and third receiving means respectively comprise lenses positioned to focus scattered radiation from said scattering volume on the input of said photo-multipliers.

4. The apparatus of claim 3 including a variable neutral density filter disposed in the path of said beam of coherent radiation for controlling the intensity of said reference signals.

5. The apparatus of claim 2 including a single sideband modulator disposed in the path of said beam of coherent radiation for selectively converting the frequency of said reference signals.

6. The apparatus of claim 1 including first monitoring means for recording said DC level output of said first, second and third frequency to voltage converters; and second monitoring means for recording the AC component in the output of said first, second and third frequency to voltage converters.

References Cited

UNITED STATES PATENTS 3,409,369  11/1968  Bickel _____ 356—28

OTHER REFERENCES

Proceedings of the IEEE, "Laser Doppler Velocimeter for Measurement of Localized Flow Velocities in Liquids," by J. W. Forman, Jr., et al., March 1966, pp. 424–425.

RODNEY D. BENNETT, Jr., Primary Examiner

M. F. HUBLER, Assistant Examiner

U.S. Cl. X.R.

73—194